(12) United States Patent
Metz

(10) Patent No.: US 6,777,894 B2
(45) Date of Patent: Aug. 17, 2004

(54) WINDSCREEN WIPER SYSTEM

(75) Inventor: Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,612

(22) PCT Filed: Apr. 25, 2001

(86) PCT No.: PCT/DE01/01550

§ 371 (c)(1),
(2), (4) Date: Aug. 21, 2002

(87) PCT Pub. No.: WO02/06094

PCT Pub. Date: Jan. 24, 2002

(65) Prior Publication Data

US 2003/0101529 A1 Jun. 5, 2003

(30) Foreign Application Priority Data

Jul. 19, 2000 (DE) .......................... 100 35 042

(51) Int. Cl.$^7$ ................................................ H02P 1/00
(52) U.S. Cl. ................... 318/443; 318/DIG. 2; 318/445; 318/280; 318/282; 318/449; 318/469
(58) Field of Search ................. 318/DIG. 2, 443, 318/445, 280, 283, 286, 449, 466, 468, 469

(56) References Cited

U.S. PATENT DOCUMENTS

| | | | | | |
|---|---|---|---|---|---|
| 2,744,282 A | * | 5/1956 | Dyer et al. | ................. | 15/250.3 |
| 3,602,937 A | * | 9/1971 | Kelley | ..................... | 15/250.13 |
| 4,866,357 A | * | 9/1989 | Miller et al. | ................. | 318/443 |
| 5,201,094 A | | 4/1993 | Ohhashi et al. | .......... | 15/250.13 |
| 5,506,483 A | * | 4/1996 | McCann et al. | ............ | 318/444 |
| 5,570,488 A | * | 11/1996 | Deng | ....................... | 15/250.16 |
| 6,249,098 B1 | * | 6/2001 | Miyazaki et al. | ........... | 318/280 |
| 6,393,653 B1 | * | 5/2002 | Harris et al. | ............... | 15/250.3 |

FOREIGN PATENT DOCUMENTS

| | | |
|---|---|---|
| DE | 36 39 831 | 5/1988 |
| DE | 197 32 520 | 2/1999 |
| EP | 0 585 010 | 2/1994 |

* cited by examiner

Primary Examiner—Rina Duda
(74) Attorney, Agent, or Firm—Kenyon & Kenyon

(57) ABSTRACT

A wiper device for a window, in particular in a motor vehicle, including a wiper blade, a mechanical system that drives the wiper blade, and a control device that compensates for the clearances of the mechanical system as a function of load changes and/or as a function of service life and a method for operating such a wiper device.

22 Claims, 4 Drawing Sheets

WINDSCREEN WIPER SYSTEM

FIELD OF THE INVENTION

The present invention relates to a device and a method for wiping a window.

BACKGROUND INFORMATION

Devices for wiping a window may have an electric motor, a mechanical system, as well as one or more wiper blades, which may be swivel-driven by an electric motor. In a motor vehicle, the wipers may swivel between an upper wiper blade end position, which may be located in the region of the A-pillar of the vehicle, and a lower wiper blade end position, which may be located at the lower edge of the windshield.

The mechanical system may include a crank drive made up of torque rods and connecting rods, which may be interconnected by bearings. Since, during operation of the wiper device, considerable bearing forces may be constantly exerted transversely to the bearing axis, it may be made from an especially high-quality material to prevent premature wear. Alternatively, the wiper blade end positions may be situated far enough from the A-pillar or the lower window edge, to compensate for displacements of this position due to wear.

SUMMARY OF THE INVENTION

According to an exemplary device and/or exemplary method of the present invention, a control device may compensate for clearances of the mechanical systems, which may become greater as the number of loads increases, due to wear. Since constant load changes may subject the crank drive bearings to wear, thereby degrading bearing quality, a shifting in the reversing position of the wiper blades on the window may occur with increasing age of the vehicle or with increasing age of the wiper device. These clearances of the mechanical systems may be compensated for with the aid of a control device according to an exemplary embodiment and/or exemplary method of the present invention, so that the wiper blades may return to the same position over the entire service life of the wiper device.

The clearance of the mechanical system as a function of service life may also be compensated, since vibrations that may occur during vehicle operation may also cause the bearing play to increase, due to the weight of the individual components of the wiper device.

An overlapping compensation as a function of load change and service life may be used.

The drive end positions, in which the reversible electric motor changes its direction of rotation, may be modified as a function of service life or with an increase in the number of load changes. This may enable the wiper blade end positions to be precisely maintained, without requiring expensive sensors in the region of the windshield or the wiper blades to detect the exact position of the wiper blades.

If the service life of the mechanical system is dependent upon the distance traveled by the vehicle, a separate time measuring device may not be required in the vehicle. The distance traveled by the motor vehicle may be obtained from the odometer of the motor vehicle.

The compensation may occur incrementally every fifty- to two-hundred thousand (e.g. every hundred thousand) wiping periods or load changes. In this manner, a compensation may only be implemented if a measurable difference between the desired wiper blade end position and the actual wiper blade end position is reached.

The control device may be configured such that a compensation may be effected every two- to ten-thousand kilometers. This may allow an incremental compensation, even if the vehicle is only used in fairly dry weather. In the case of cabriolets, which may be used in dry weather on secondary roads having uneven road surfaces, vehicle vibrations may be naturally more pronounced than on expressways.

Compensation may be allowed to occur continuously after each wiping period. In this manner, an optimal wiper blade end position may be maintained. Also, there may be no need for additional signals from the odometer, the clock or a wiper-period counter.

The control device may be configured such that only the upper wiper blade end position, in the region of the A-pillar, is subject to compensation. The area of the A-pillar may be the critical area in which the wiper blade, on the one hand, may need to be guided as closely as possible to the A-pillar in order to achieve as large a wiping field as possible, yet, on the other hand, may not touch the A-pillar, in particular during rapid wiping operation. However, this may happen if there is no compensation for the increase in the clearance of the mechanical system. This may not be as critical in the lower wiper blade end position, since this may be only of secondary importance to the driver's field of vision.

DETAILED DESCRIPTION

Figure 1:
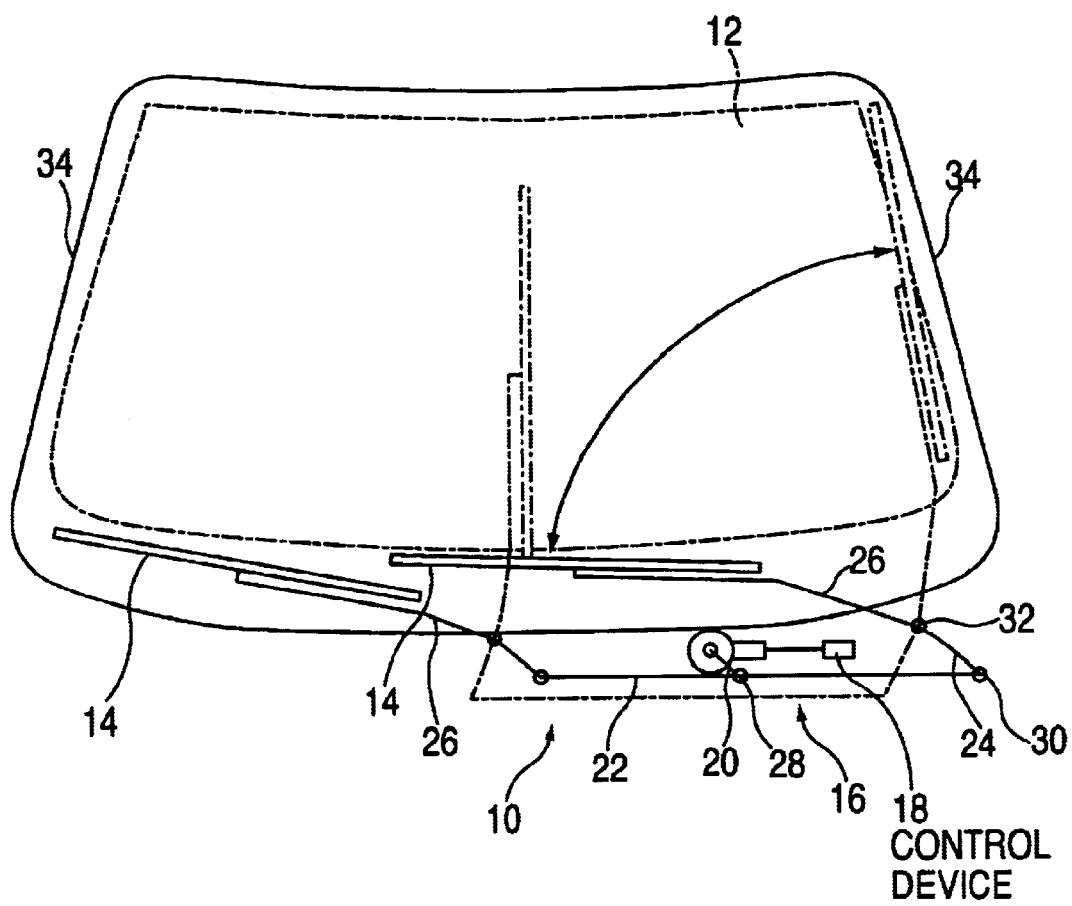
FIG. 1 is a schematic depiction of an exemplary wiper device according to the present invention.

FIG. 1 depicts a wiper device 10 on window 12. Wiper device 10 has two wiper blades 14 and a mechanical system 16, as well as a control device 18.

In this case, mechanical system 16 includes a connecting rod 20, a torque rod 22 and an output crank 24. Attached thereto are wiper arms 26, which are equipped with wiper blades 14. Connecting rod 20, torque rod 22, crank 24 and wiper arms 26 are rotatably connected to one another via three bearings. Connecting rod 20 and torque rod 22 are connected via the torque rod bearing 28, the torque rod and the output crank via the output crank bearing 30, and output crank 24 with wiper arm 26 via wiper bearing 32.

Window 12, in this case, is the windshield of a motor vehicle. On its sides 34, it is framed by the A-pillars of the motor vehicle.

Wiper blades 14 are shown by continuous lines in a lower wiper blade end position 36, and by dotted lines in an upper wiper blade end position 38. The area between these two positions 36 and 38 includes a swing angle p.

Since the wiper device shown is a synchronized wiper device, wiper blade 14 is located in upper wiper blade end position 38 in the area of the motor vehicle's A-pillar, that is, in the area of one of sides 34 of window 12.

Mechanical system 16 is driven by a drive 40, which is designed as reversible, electronically commutable electric motor 40. It is connected to control device 18, which controls electric motor 40.

Figure 2:
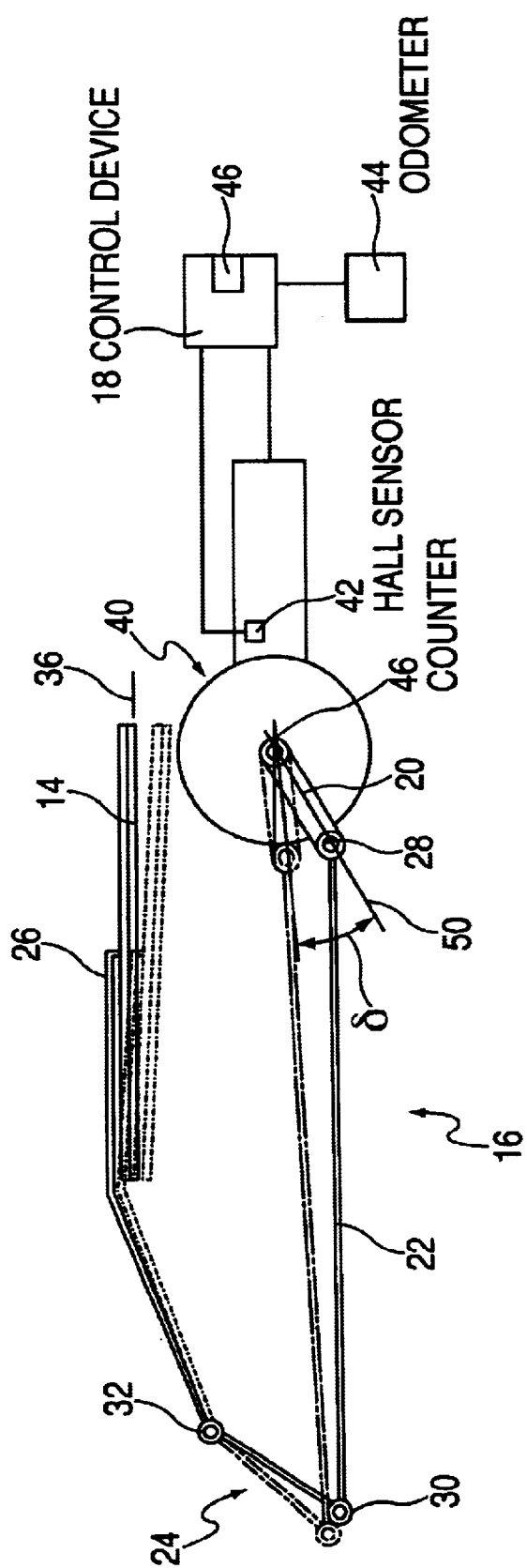
FIG. 2 shows a part of an exemplary wiper device according to the present invention, having a wiper blade in the lower wiper blade end position.

FIG. 2 shows a cut-away portion of FIG. 1. Wiper blade 14, wiper arm 26 are connected to output crank 24 via wiper bearing 32. It, in turn, is connected to torque rod 22 via output crank bearing 30, which is driven by electric motor 40 via torque rod bearing 28 and connecting rod 20. In this case, electric motor 40 is equipped with a Hall sensor 42, which transmits signals indicative of the position of the armature shaft of electric motor 40 to control device 18. As a result, it is informed of the instantaneous position of connecting rod 20. In addition, control device 18 may also be connected to an odometer 44, for instance, and/or a counter 46 which detects the number of reversions of electric motor 40.

Drive 40, in this case, is in a lower drive end position 50, so that wiper blade 14 is in the lower wiper blade end position 36.

Figure 3:
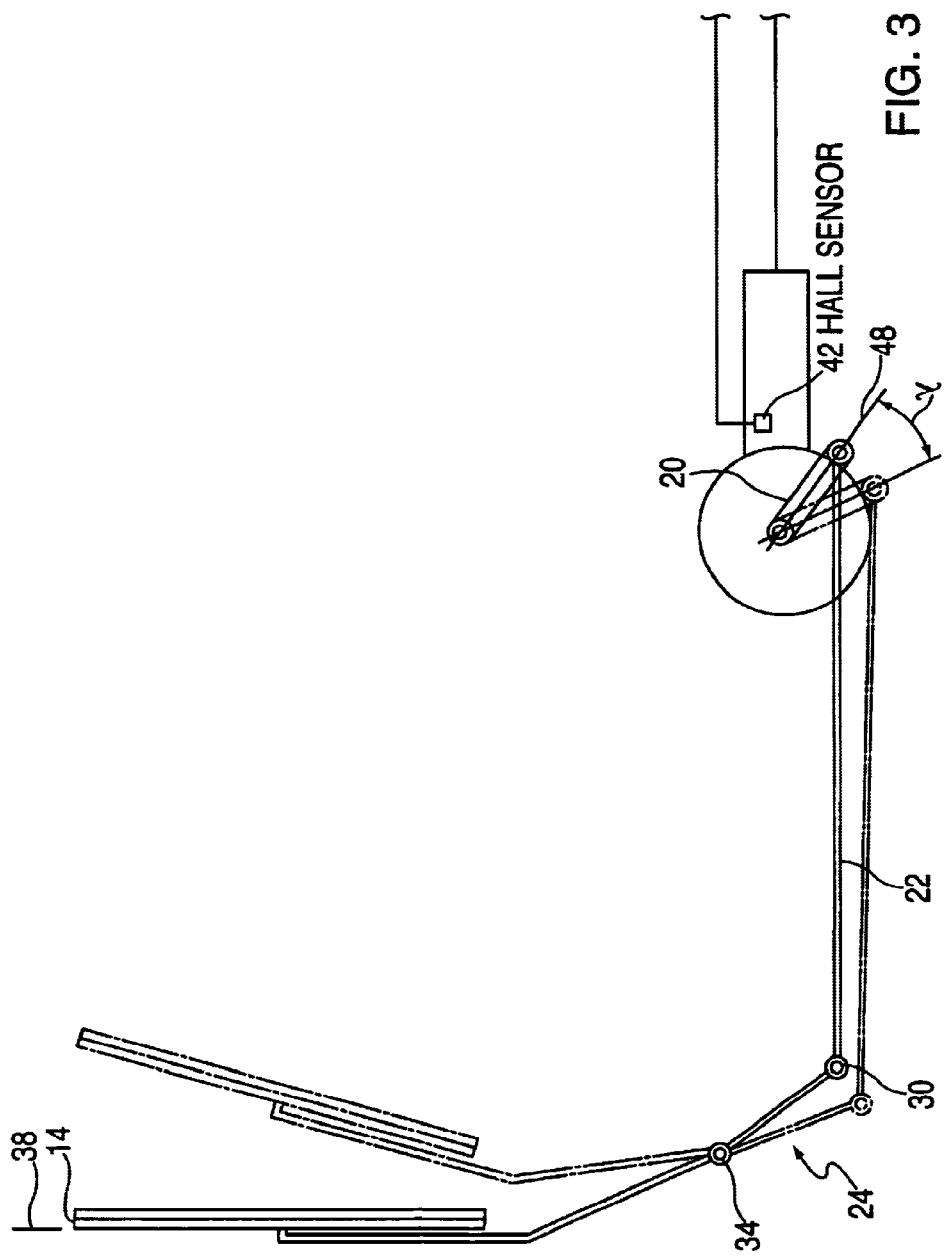
FIG. 3 shows an exemplary wiper device according to the present invention as shown in FIG. 2, but with the wiper blade in the upper wiper blade end position.

In FIG. 3, the same area is shown as in FIG. 2, but wiper blade 14 is in the upper wiper blade end position 38, and connecting rod 20, therefore, in the upper drive end position.

The functioning of the wiper device is described below.

Electric motor 40, via a worm and a worm gear, moves an output crank 46, to which connecting rod 20 is rotatably fixed. In order to move wiper blade 14, connecting rod 20 executes a swivel movement, with the aid of electric motor 40, between an upper drive end position 48 and a lower drive end position 50. Each of these corresponds to upper wiper blade end position 38 and lower wiper blade end position 36.

As a result of varying environmental influences on mechanical system 16, in particular on bearings 28, 30, 32, the bearing clearance of individual bearings 28, 30, 32 increases over time, leading to a shifting of wiper blade end positions 36, 38. Due to overswinging, this may result, for instance, in wiper blade 14 striking the vehicle's A-pillar in upper wiper blade end position 38 during rapid wiper operation, causing damage to it within a very short period of time. During slow wiper operation, in which the wiper blade is dragged across window 12, upper wiper blade end position 38 would move more and more towards the inside, and swing angle P would, thus, become increasingly smaller.

According to the present invention, control device 18 is designed such that, with increasing service life, or with an increase in the number of load changes, the lower or upper drive end position 48, 50 is shifted. This shifting also depends, for instance, on the speed with which wiper blade 14 glides across window 12. As also already discussed, it may, therefore, be useful to shift upper drive end position 48 towards smaller swing angles P during rapid wiper operation, in order to prevent wiper blade 14 from hitting the A-pillar, while drive end position 48 is shifted toward a larger swing angle P, by an angle y, in slow wiper operation. The compensation may be individually adapted to the motor vehicle.

The same compensation as in FIG. 2 may be analogously implemented in lower wiper blade end position 36. With increasing service life, lower drive end position 50 is shifted towards larger swing angles P, by an angle d, in slow wiper operation.

Figure 4:
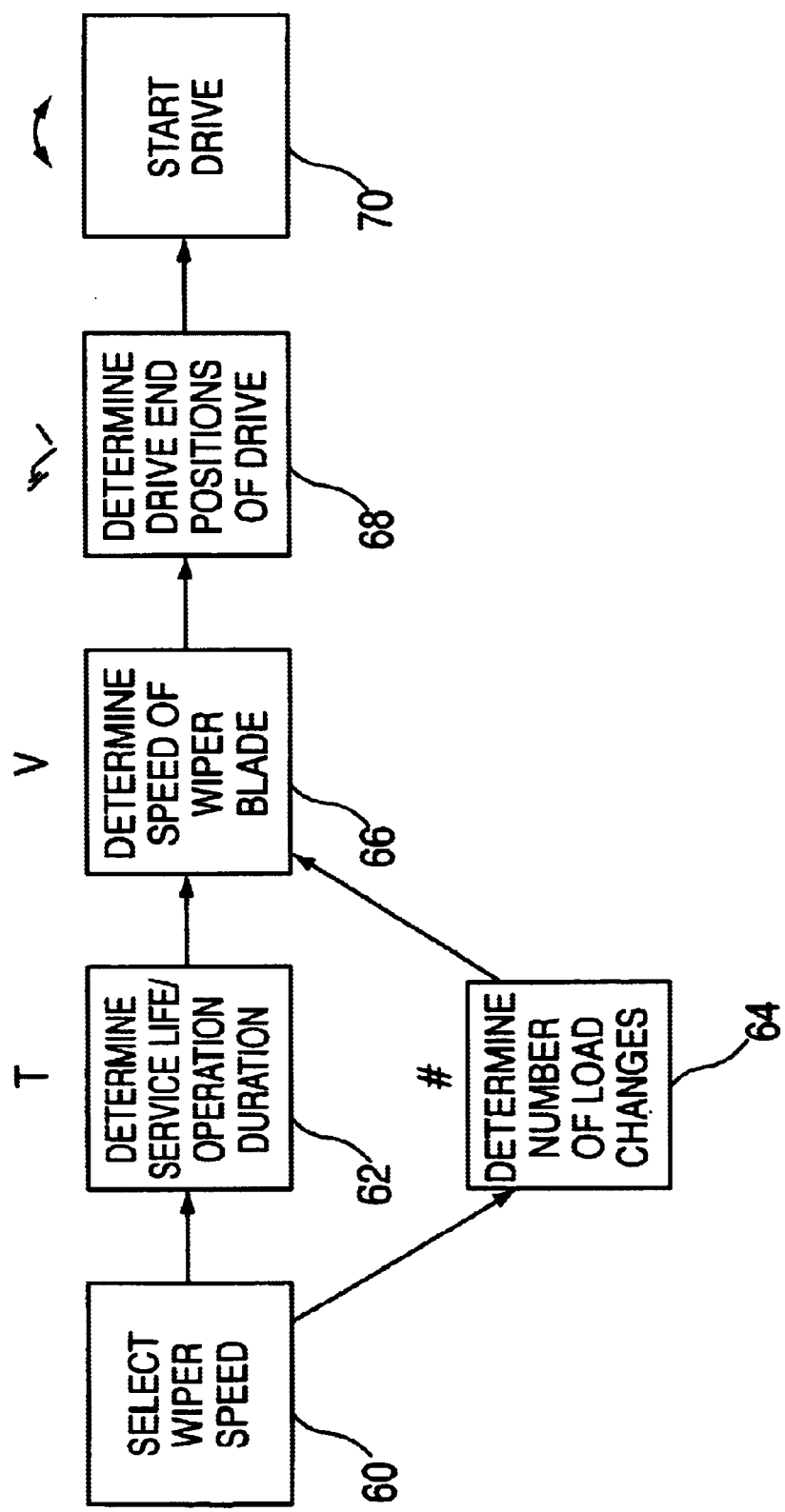
FIG. 4 is a schematic representation of an exemplary method according to the present invention.

FIG. 4 shows another exemplary embodiment of an exemplary method according to the present invention. In a first step 60, the wiper device is switched to rapid or slow wiper operation. In a second step 62 and/or 64, the service life/operation duration and/or the number of load changes that have occurred thus far is determined. In a third step, the speed of wiper blades 14 is then determined, for instance, by determining whether the wiper device has been switched to fast or slow wiper operation. As a function of the results from second and third steps 62 through 66, drive end positions 48 and 50 of drive 40 are then determined in a fourth step 68, and drive 40 started in fifth step 70.

What is claimed is:

1. A wiper device for a window of a motor vehicle, the wiper device comprising:
   a wiper blade;
   a mechanical system to drive the wiper blade; and
   a control device to compensate for changes in clearances of the mechanical system as a function of at least one of load changes and a service life of the mechanical system.

2. The wiper device of claim 1, wherein the control device compensates for the changes in clearances as a function of the service life.

3. The wiper device of claim 1, further comprising an electronically reversible drive, wherein the mechanical system is operable to rotatably move the wiper blade via the electronically reversible drive between an upper wiper blade end position and a lower wiper blade end position associated with two drive end positions;
   wherein, to compensate for the changes in clearances, the control device is operable to change the two drive end positions for at least one of as a number of load changes increases and as the service life of the mechanical system increases.

4. The wiper device of claim 1, wherein the service life of the mechanical system is determined by a distance traveled by the motor vehicle.

5. The wiper device of claim 1, wherein the control device is operable to compensate incrementally one of every 50,000 to 200,000 wiper periods and every 50,000 to 200,000 load changes.

6. The wiper device of claim 4, wherein the control device is operable to compensate incrementally every 2,000 to 10,000 km.

7. The wiper device of claim 1, wherein the control device is operable to compensate continuously one of prior and subsequent to each wiping period.

8. The wiper device of claim 3, wherein the control device is operable to compensate only at a drive end position corresponding to the upper wiper blade end position.

9. The wiper device of claim 1, wherein the control device is operable to compensate as a function of a velocity of a motion of the mechanical system.

10. The wiper device of claim 1, wherein the control device is operable to compensate incrementally one of every 100,00 wiper periods and every 100,000 load changes.

11. The wiper device of claim 4, wherein the control device is operable to compensate incrementally every 5,000 km.

12. A method for controlling a wiper device of a motor vehicle, the method comprising:
   driving a wiper blade via a mechanical system driven by an electronically reversible drive; and
   compensating for changes in clearances of the mechanical system as a function of one of load changes and a service life of the mechanical system.

13. The method of claim 12, wherein the changes in clearances are compensated as a function of the service life.

14. The method of claim 12, wherein:
   the mechanical system rotatably drives the wiper blade between an upper and a lower wiper blade end position associated with two drive end positions and defining a swing angle; and
   a control device compensates for the changes in clearances by changing the drive end positions at least one of as a number of load changes increase and as the service life of the mechanical system increases.

15. The method of claim 14, wherein the service life of the mechanical system is determined by a distance traveled by the motor vehicle.

16. The method of claim 14, wherein the control device compensates incrementally one of every 50,000 to 200,000 wiper periods and every 50,000 to 200,000 load changes.

17. The method of claim 15, wherein the control device compensates incrementally every 2,000 to 10,000 km.

18. The method of claim 14, wherein the control device compensates continuously one of prior and subsequent to each wiping period.

19. The wiper device of claim 14, wherein the control device compensates only at a drive end position corresponding to the upper wiper blade end position.

20. The method of claim 14, wherein the control device compensates as a function of a velocity of a motion of the mechanical system.

21. The method of claim 14, wherein the control device is compensates incrementally one of every 100,000 wiper periods and every 100, 00 changes.

22. The method of claim 15, wherein the control device compensates incrementally every 5,000 km.

* * * * *

UNITED STATES PATENT AND TRADEMARK OFFICE
CERTIFICATE OF CORRECTION

PATENT NO. : 6,777,894 B2 Page 1 of 1
DATED : August 17, 2004
INVENTOR(S) : Ulrich Metz It is certified that error appears in the above-identified patent and that said Letters Patent is hereby corrected as shown below:

<u>Column 6,</u>
Line 9, change "every 100,00 changes" to -- every 100,000 load changes --

Signed and Sealed this

Thirty-first Day of May, 2005

JON W. DUDAS
*Director of the United States Patent and Trademark Office*